United States Patent [19]
Wiggins et al.

[11] 4,379,449
[45] Apr. 12, 1983

[54] SOLAR HOT AIR SYSTEM

[76] Inventors: John W. Wiggins; Damon E. Moore, both of P.O. Box 138, Dundee, Mich. 48131

[21] Appl. No.: 186,572

[22] Filed: Sep. 12, 1980

[51] Int. Cl.$^3$ ............................................... F24J 3/02
[52] U.S. Cl. .................................. 126/449; 126/429; 126/431; 126/450
[58] Field of Search ............... 126/417, 449, 429, 428, 126/444, 450, 431

[56] References Cited

U.S. PATENT DOCUMENTS

| 3,102,532 | 9/1963 | Shoemaker | 126/441 |
| 4,068,652 | 1/1978 | Worthington | 126/431 X |
| 4,172,442 | 10/1979 | Boblitz | 126/450 X |
| 4,210,129 | 7/1980 | O'Hanlon | 126/449 X |
| 4,212,292 | 7/1980 | Reinert | 126/449 |
| 4,258,701 | 3/1981 | Buckley | 126/450 X |

Primary Examiner—Larry Jones
Attorney, Agent, or Firm—Hiram P. Settle

[57] ABSTRACT

This solar hot air system is designed to trap and hold heat radiation from the sun, so as to heat one's home and reduce fuel consumption. It consists primarily of a glass, a screen, a collector, and air chambers, the combination of which utilizes two sheets of aluminum to trap and hold heat waves, until removed from the unit. It further includes a powerful small fan, to extract maximum heat from the collector while the sun is shining, and the unit is such, that it may be installed upon a vertical exterior wall, on a sloping roof, or upon a flat roof.

1 Claim, 2 Drawing Figures

SOLAR HOT AIR SYSTEM

This invention relates to solar heating devices, and more particularly, to a solar hot air system.

It is, therefore, the principal object of this invention to provide a solar hot air system, which will be of such structure, as to trap and retain heat radiation from the sun, to thus function as a supplementary system for heating a person's home, while substantially reducing fuel consumption.

Another object of this invention is to provide a solar hot air system, which will employ the use of a powerful small fan, for extracting maximum heat from the collector of the system, while the sun is shining.

Another object of the invention is to provide a solar hot air system, which will be of such structure, that it will enable a measured amount of air-flow to pull off the excess heat between the collector and the screen of the system.

A further object of this invention is to provide a solar hot air system, which will be such, that each unit can produce heat independently; however, a right and left unit will have greater efficiency.

A still further object of this invention is to provide a solar hot air system, which will be adaptable to installation upon a vertical exterior wall, upon a sloping roof, or upon a flat roof.

Other objects of the present invention are to provide a solar hot air system, which is simple in design, inexpensive to manufacture, rugged in construction, easy to use and efficient in operation.

These and other objects will be readily evident upon a study of the following specification, and the accompanying drawing, wherein.

Figure 1:
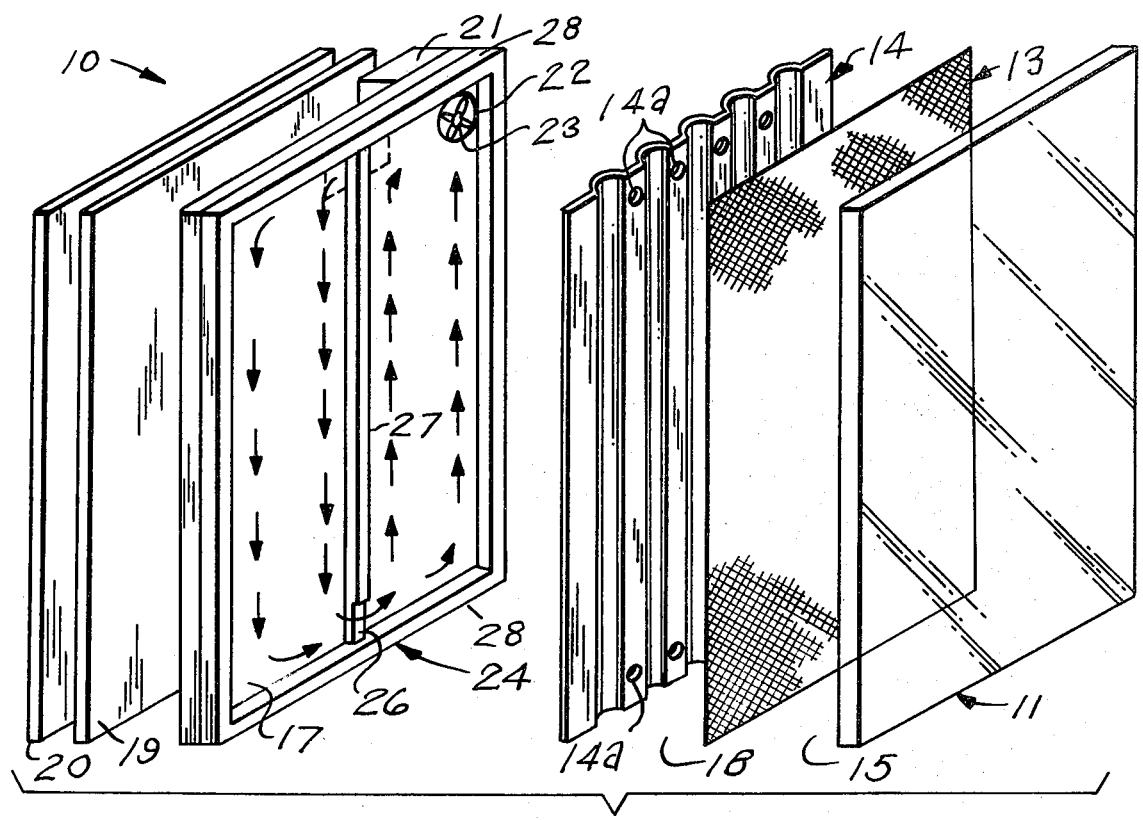
FIG. 1 is a partially exploded perspective view of the present invention.
Figure 2:
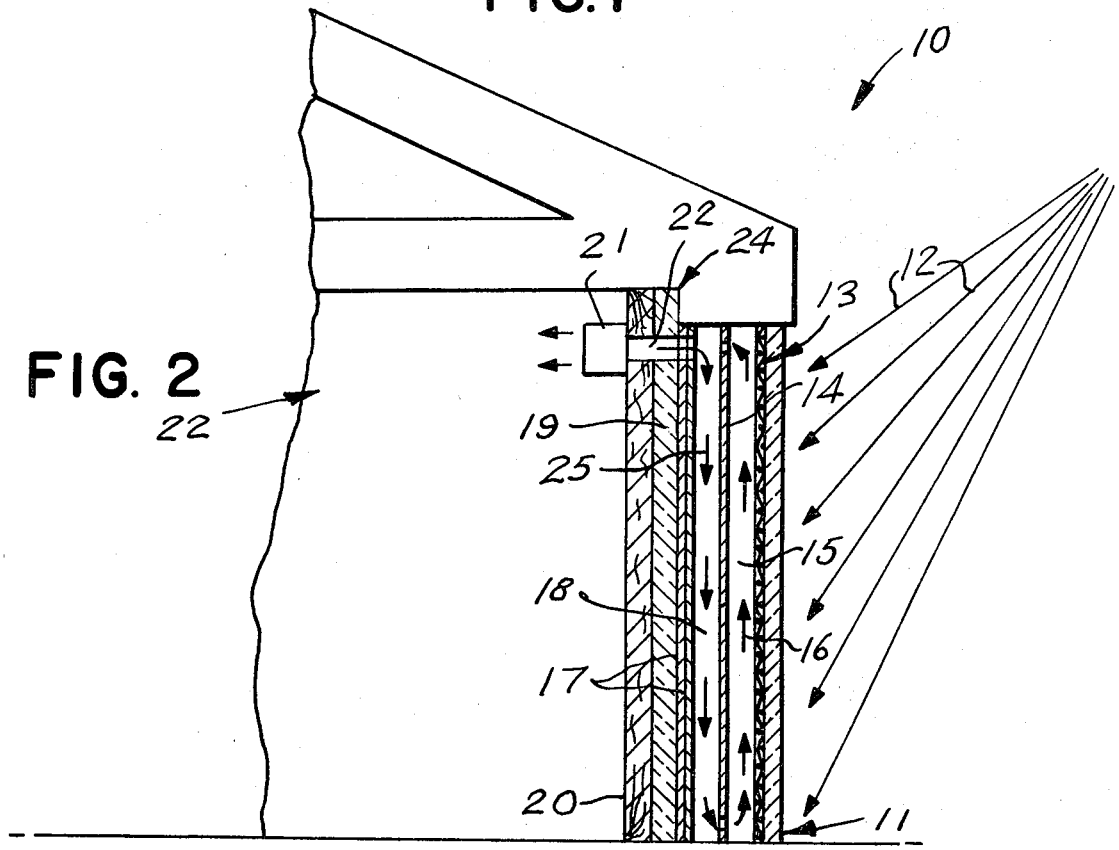
FIG. 2 is a side view of the invention, shown in section, and installed on a home.

According to this invention, a solar hot air system 10 is shown to include a sheet of plate glass 11, through which the sun's rays 12 pass. In abutment with plate glass 11 is a similarly shaped metal screen 13, which is painted with a suitable black paint, so as not to be reflectable. A corrugated aluminum collector 14, also coated or painted black, is spaced apart from screen 13, and the sealed front chamber 15, thus defined thereby, enables air to flow, as indicated by the arrows 16.

It shall be noted, that the screen 13 also serves as a collector, simultaneously with the primary collector 14, and screen 13 prevents the sun's rays from bouncing off of the collector 14 and back through the glass 11. Also, the screen 13 further serves as a means to help separate the heated air from the relatively cold glass 11.

A plurality of equally spaced-apart and aligned openings 14a, through the top and bottom of collector 14, serve as a means of enabling a measured amount of air-flow, to pull off the excess heat between the collector 14 and the screen 13, and it should also be noted, that this system 10 is thermostatically controlled, with a bonnet heat controlled switch (not shown).

Collector 14 is spaced apart from two sheets 17 of aluminum foil, thus defining a second sealed chamber 18, for the flow of air. Sheets 17 are adhered in abutment with each other and suitably adhered to an insulating panel 19, which is fixedly secured, by suitable means, (not shown) to the opposite side of plywood panel 20, and an opening 22 through the upper corners of 17, 19 and 20 aligns with duct 21, for the passage of the heated air, which is pushed into the house 22, by means of the blower 23. The insulating panel 19 is fixedly secured, in a suitable manner (not shown) to one side of the rectangularly configured frame 24, which is suitably secured to the interior of house 22, and thus seals system 10. Cool air, as illustrated by means of the arrows 25, enters through one side of duct 21 (not shown), and travels through the cut-out 26 of center divider member 27, which is fixedly secured, at its ends, to the end members 28 of frame 24. The cool air is heated by the collector 14, and travels upwards and out of the opposite side (not shown) of duct 21.

It shall further be recognized, that system 10 may employ as many of the heretofore described units as necessary for heating.

In use, the units of system 10 are installed on the sides, on the roof, or may be installed on both, for maximum efficiency. When the sun's rays enter through glass 11, they pass through screen 13, which is the secondary collector of one side of chamber 15, and the collector 14, forming the opposite side of chamber 15, is the primary collector means, which, by being corrugated in cross-sectional configuration, will retain the greatest amount of heat to be transferred to the incoming cool air, as indicated by the arrow 25 means. The openings 14a of collector 14 fundamentally serve as orifice means, to carry off any excessive heat, thus preventing any undue expansion of the heretofore described components of system 10.

While various changes may be made in the detail construction, it is understood that such changes will be within the spirit and scope of the present invention, as is defined by the appended claims.

What we now claim is:

1. A solar hot air heating system adapted to be installed in an opening within a building disposed between the interior and the exterior of the building comprising:
   a perimetric frame secured in said opening and having upper and lower sides;
   a light transparent plate secured in said frame and having first and second sides, the first outer side facing the exterior and the second inner side facing the interior;
   a single light absorptive corrugated metal sheet plate secured within said frame with the corrugations thereof vertically oriented, said plate having first and second sides, the first side facing the second side of the light transparent plate and being displaced from the first side of the light absorptive plate, the opening of the building, the second side of the optically transparent plate and the first side of the light absorptive plate defining a first air flow passage containing a volume of air which is heated by light energy passing through the transparent plate and absorbed by the light absorptive plate;
   a light absorptive mesh secured to the second side of the transparent plate, the metal mesh functioning as a light absorptive means for part of the light energy passing through the optically transparent plate, as a means for preventing reflection of light energy back through the optically transparent plate and as a means for insulating the optically transparent plate from the volume of air to lessen heat flow from the first volume of air out through the transparent member;
   a light reflective plate secured within said frame having first and second sides, the first side of the light reflective plate being displaced from and facing the second side of the light absorptive plate, the opening of the building, the second side of the light absorptive plate and the first side of the light reflective plate forming a second air flow passage containing a volume of air;

an insulating plate secured to the second side of the light reflective plate;

said light reflective plate having an upper inlet opening and an upper separate outlet opening, and said corrugated plate having air circulating apertures at both its upper and lower marginal edges, said apertures being intermediate the plate corrugations and affording communication between said first and second air flow passages; and blower means for circulating air through said first and second air passages, cool air entering said inlet opening, flowing downwardly through said second passage through the lower apertures in said corrugated plate, then upwardly through said first passage and through the upper apertures of said corrugated plate to exit through the outlet opening of said light reflective plate, the air being heated by the single corrugated plate during its flow in opposite directions through the first and second passages.

* * * * *